United States Patent
Schreifels (10) Patent No.: US 8,887,059 B2
(45) Date of Patent: Nov. 11, 2014

(54) METHOD AND APPARATUS OF LOCALLY CONTROLLING DISPLAY CONTENT OF A REMOTE SYSTEM

(75) Inventor: Patrick Jon Schreifels, Ventura, CA (US)

(73) Assignee: Kaseya Limited (IE)

( * ) Notice: Subject to any disclaimer, the term of this patent is extended or adjusted under 35 U.S.C. 154(b) by 20 days.

(21) Appl. No.: 13/191,686

(22) Filed: Jul. 27, 2011

(65) Prior Publication Data

US 2013/0031481 A1  Jan. 31, 2013

(51) Int. Cl.
*G06F 3/00* (2006.01)
*G06F 9/44* (2006.01)

(52) U.S. Cl.
CPC .................. *G06F 9/4445* (2013.01)
USPC ............ 715/740; 715/781; 715/751; 715/803

(58) Field of Classification Search
None
See application file for complete search history.

(56) References Cited

U.S. PATENT DOCUMENTS

| | | | |
|---|---|---|---|
| 5,227,771 A * | 7/1993 | Kerr et al. ..................... | 715/800 |
| 6,343,318 B1 * | 1/2002 | Hawkins et al. .............. | 709/219 |
| 6,911,987 B1 * | 6/2005 | Mairs et al. ................... | 345/557 |
| 6,950,991 B2 * | 9/2005 | Bloomfield et al. .......... | 715/738 |
| 7,069,573 B1 * | 6/2006 | Brooks et al. .................. | 725/62 |
| 7,574,653 B2 * | 8/2009 | Croney et al. ................. | 715/249 |
| 7,669,140 B2 * | 2/2010 | Matthews et al. ............. | 715/779 |
| 7,870,496 B1 * | 1/2011 | Sherwani ...................... | 715/761 |
| 8,082,517 B2 * | 12/2011 | Ben-Shachar et al. ........ | 715/781 |
| 8,254,704 B2 * | 8/2012 | Lu et al. ........................ | 382/232 |
| 8,756,513 B1 * | 6/2014 | Schmieder et al. ........... | 715/753 |
| 2002/0083201 A1 * | 6/2002 | Iyengar et al. ................ | 709/246 |
| 2005/0091609 A1 * | 4/2005 | Matthews et al. ............. | 715/804 |
| 2009/0300541 A1 * | 12/2009 | Nelson .......................... | 715/799 |
| 2010/0111410 A1 * | 5/2010 | Lu et al. ........................ | 382/166 |

* cited by examiner

*Primary Examiner* — Matt Kim
*Assistant Examiner* — Mahelet Shiberou (57) ABSTRACT

A method and apparatus of controlling the viewable content of a remote computer system on a local computer system is disclosed. The method may include establishing a remote control session over a network to the remote computer system and accessing the viewable content currently displayed on the remote computer system. The method may also include reformatting the viewable content to change a size of the viewable content and displaying the reformatted viewable content on the local computer system while the remote computer system and the local computer system are communicatively connected.

14 Claims, 8 Drawing Sheets

METHOD AND APPARATUS OF LOCALLY CONTROLLING DISPLAY CONTENT OF A REMOTE SYSTEM

TECHNICAL FIELD OF THE INVENTION

This invention relates to a method and apparatus of controlling the viewable area of content displayed on a computer system, and, more particularly, to controlling a local computer system view of the content displayed on a remote computer system.

BACKGROUND OF THE INVENTION

User workstations or managed machines (computing devices) operate in a data communication network by communicating with other managed machines and/or administrative machines. Regardless of the status of the machine, administrative machines operate to support the ongoing communication and applications operating on the managed machines.

Accessing and executing commands on a managed machine through an administrative interface is a common method of updating, controlling, debugging and ensuring the continued seamless operation of the managed machine. The administrator may operate a local computing system to connect and control the operations of a remote computing system. In some instances, the content viewable on the remotely managed computer system may be simultaneously viewed by an administrator operating a local computing system. However, certain challenges are presented with the advent of varying operating systems, control interfaces and display devices of the managed machines operating on a data communication network.

Generally, the display area associated with any display device is limited in size and only provides limited real estate with respect to the amount of content that may be displayed on-screen at any given time. It is common for display devices to display multiple different windows of varying size. The windows and corresponding display attributes on one computer system may be displayed at a particular resolution (e.g., 1680×1050 pixels). The display attributes of the computer system may also be limited by a predefined viewable area of the display device (e.g., 15 inches, 17, inches, etc.).

When viewing content displayed on a remote computer system across a network via a local computer system, the remote computer system's display attributes may not readily conform to the display attributes of the local computer system. For example, the remote computer system may have a first resolution used to display a plurality of windows and other on-screen content. The local computer system may have a different resolution and display size that does not readily conform to those of the remote computer system. As a result, the plurality of windows currently displayed on the remote computer system may appear differently when being simultaneously viewed on the local computer system.

SUMMARY OF THE INVENTION

One embodiment of the present invention may include a method of establishing a remote control session over a network to the remote computer system, accessing the viewable content currently displayed on the remote computer system, reformatting the viewable content to change a size of the viewable content and displaying the reformatted viewable content on the local computer system while the remote computer system and the local computer system are communicatively connected.

One embodiment of the present invention may include an apparatus configured to control the viewable content of a remote computer system on a local computer system. The apparatus may include a transmitter configured to establish a remote control session over a network to the remote computer system, and access the viewable content currently displayed on the remote computer system. The apparatus may include a processor configured to reformat the viewable content to change a size of the viewable content and a display configured to display the reformatted viewable content on the local computer system while the remote computer system and the local computer system are communicatively connected.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1A:
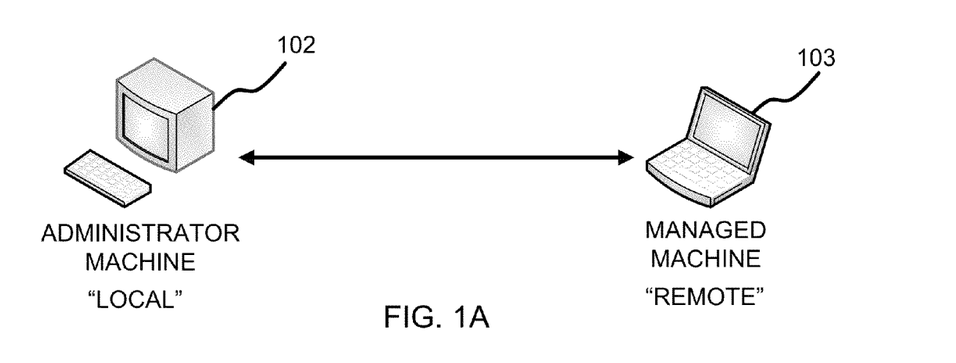
FIG. 1A illustrates a connection being established between an administrator machine and a managed machine according to example embodiments of the present invention.

FIG. 1A illustrates an example network communication path between a managed machine and an administrator machine, according to example embodiments of the present invention. Referring to FIG. 1A, an administrator machine 102 is in communication with a managed machine 103. The communication path may be over a WAN, such as, the Internet, or a LAN. The administrator machine 102 may be a server, computer or other computing device capable of providing a user interface. The managed machine 103 may be a laptop, computer, personal digital assistant, smart phone or any other computer network compatible device capable of establishing a communication path or secure channel 110 with the administrator machine 102.

Figure 1B:
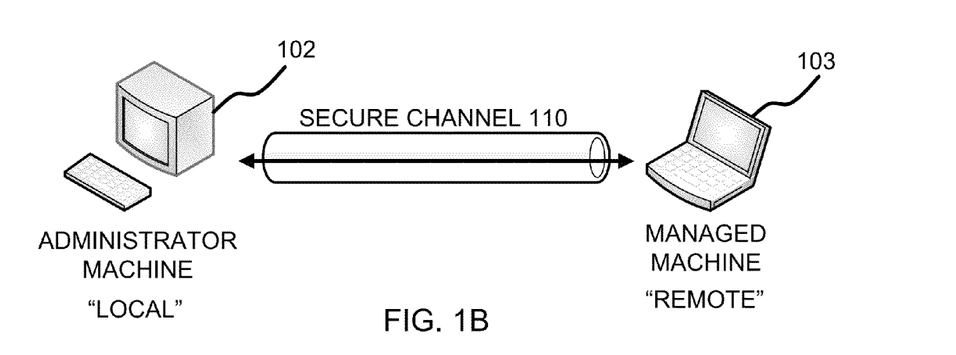
FIG. 1B illustrates a secure connection being established between an administrator machine and a managed machine according to example embodiments of the present invention.

FIG. 1B illustrates an example network communication path between a managed machine 103 and administrator machine 102 that includes an established secure channel 100, according to example embodiments of the present invention. Referring to FIG. 1B, the administrator initiates a connection via a secure channel to the remote managed machine 103. The server process running on the managed machine accepts and acknowledges the connection establishment by transferring an acceptance message back to the administrator application. A secure connection 110 may then be established between the manage machine 102 and the administrator machine 102.

According to an example embodiment of the present invention, a user may selectively and independently enlarge a window on a remote system over the secure connection 110. The window may also be returned to its original size and position. Enlarging the window may be limited to the maximum local viewable area, or 100% of the native resolution of the remote system.

A computer system for either the remote computer system and/or local computer system may include a computational device, such as a central processing unit (CPU), random access memory (RAM), a hard disk or drive, and a display device coupled to the CPU. The computer system may be a personal computer, server, laptop computer, tablet computing device, smart phone, etc.

A sizing application operating on the local computer system of the administrator machine 102 may be used to calculate a size to display the content currently being displayed on the remote computer system of the managed machine 103. Once a size is calculated, the re-sized content may then be displayed on the local computer system of the administrator machine 102. The calculation may be performed by comparing a native resolution of the remote computer system 103 to a local resolution of the local computer system 102 and display area of the local computer system.

Figure 2:
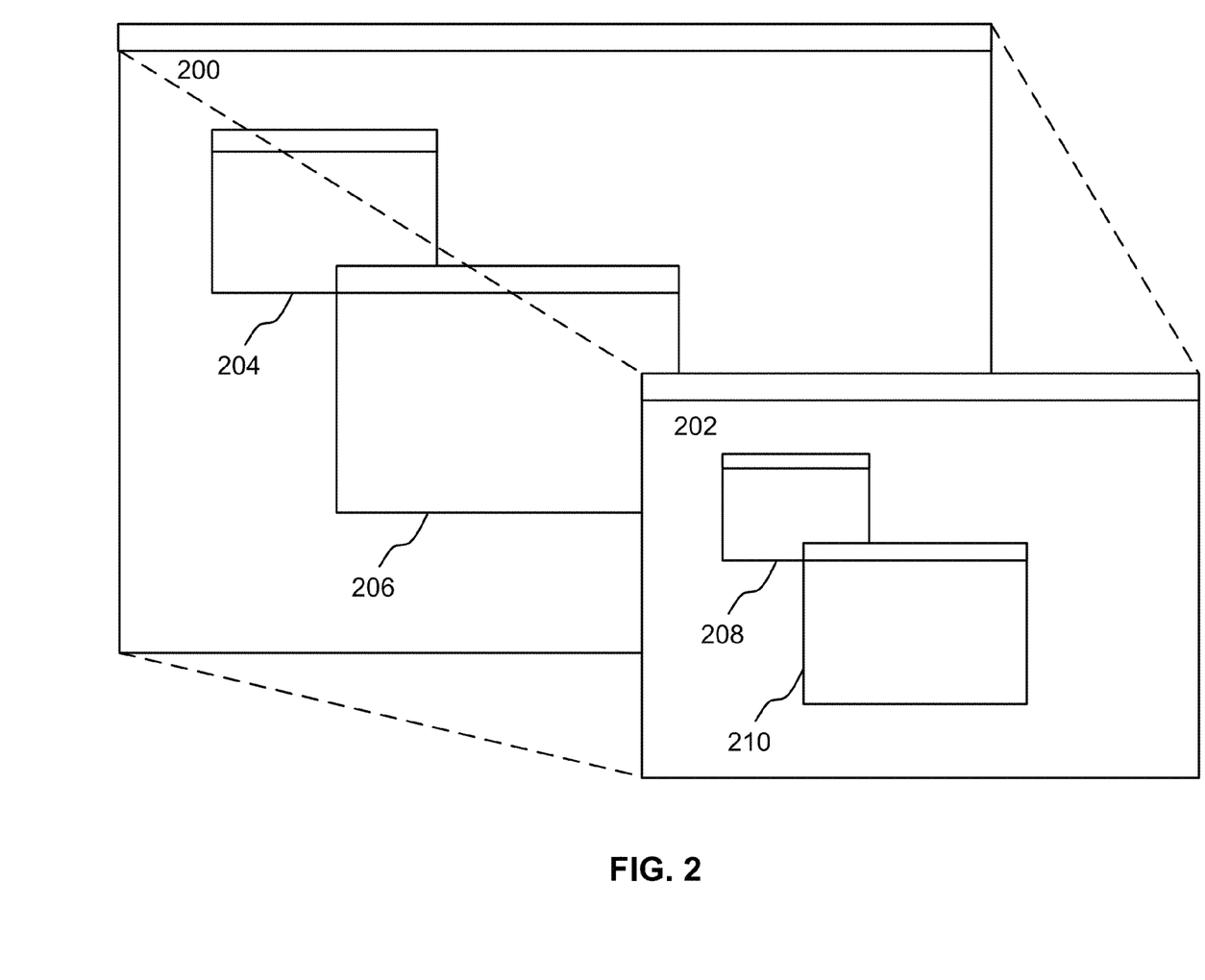
FIG. 2 illustrates an example viewable area on a remote system and a local system according to example embodiments of the present invention.

FIG. 2 illustrates a sizing application operating on the local computer system of the administrator machine 102 may be used to calculate a size to display the content currently being displayed on the remote computer system of the managed machine 103. Once a size is calculated, the re-sized content may then be displayed on the local computer system of the administrator machine 102. The calculation may be performed by comparing a native resolution of the remote computer system 103 to a local resolution of the local computer system 102 and display area of the local computer system.

FIG. 2 illustrates an example viewable area 200 on a remote computer system and an example viewable area 202 on a local computer system according to example embodiments of the present invention. Referring to FIG. 2, the remote computer system's viewable content area 200 may have a predefined resolution of 1680×1050 pixels. The viewable content area of the local computer system 202 may have a lesser resolution of only 1024×768 pixels. As a result, any content extracted from the remote computer system 103 will be oversized when compared to the current resolution of the local computer system 102. In this example, the remote computer system's displayed content must be scaled by a factor that is approximately 61% of its original size prior to displaying the content on the local computer system 202.

In this example, two windows 204 and 206 are illustrated as being part of the remote computer system's display area 200. As the content of the display area is resized for the local computer system's display area 202, the corresponding windows 204 and 206 are automatically recalculated in size to adjust to the scaling factor of the local computer system's display area. The adjusted windows from the remote computer system's display area 200 are transformed into two smaller windows 208 and 210, which are displayed in the content area of the local computer system 202. As indicated above, the native resolution of the remote computer system 103 is larger than the resolution and resulting local computer system viewable area 202. The sizing application scaled the content of the remote computer system to fit into the viewable area of the local computer system.

The size at which the remote desktop will display its viewable content may be determined by comparing the resolution of the remote system's display area 200 to the area in which the remote system is displayed on the local display area 202. For instance if the remote system display area 200 has a present resolution of 1680×1050 pixels and the area in which that remote system is currently being displayed is 1024×768, then the current remote session will be scaled to 61% of the original size. This is done by comparing the scaling of the width of the display are 1680 down to 1024, or 61%, and comparing the scaling of the height of the display 1050 down to 768, or 73% and taking the smaller of the two values to preserve the aspect ratio. Since we know that everything from the remote system is being scaled down 39%, that threshold becomes the limit for the total amount that can be scaled up any individual window in the display area of the local system display area 202. Each window from the remote system display 202 that is being displayed on the local system may display 200 may be individually resized.

Figure 3:
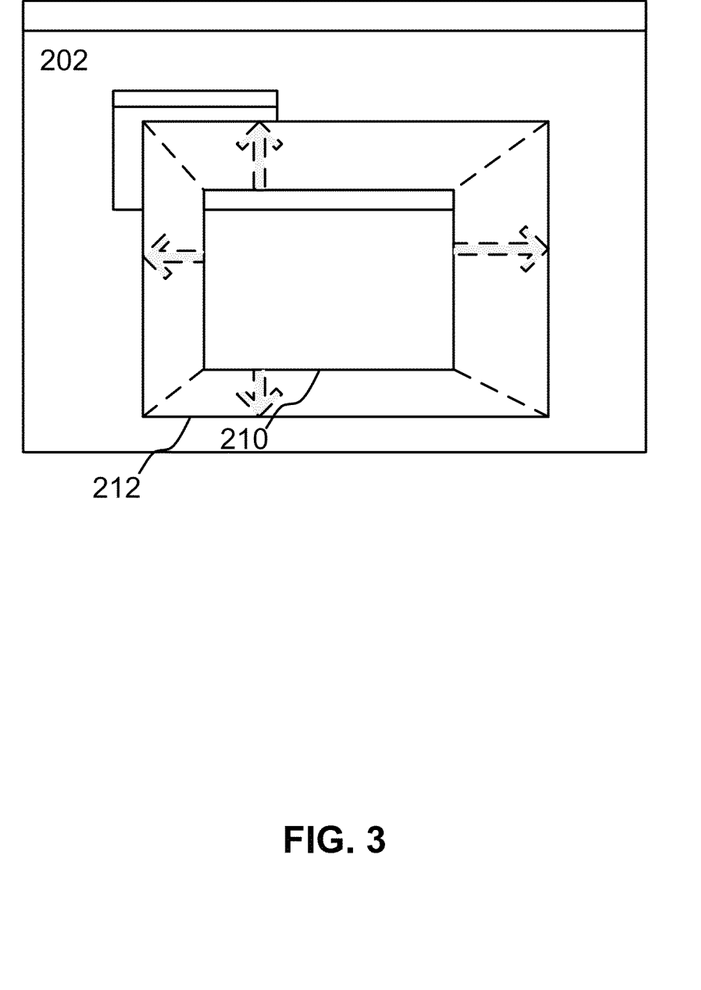
FIG. 3 illustrates an example viewable area of the content of a remote system being adjusted for the viewable area of a local system according to example embodiments of the present invention.

FIG. 3 illustrates an example viewable area of the content of a remote computer system being adjusted for the viewable area of a local computer system according to example embodiments of the present invention. Referring to FIG. 3, the content area of the local computer system 202 includes one or more windows that were translated from the content of the remote computer system's display area 200. In addition to providing the content to the local computer system, the windows may be automatically resized via an individual window isolation feature of the sizing application. For example, window 210 may be easily resized to enlarge or shrink the window size. In this example, the window 210 has been enlarged as indicated by the arrows to become a larger window 212. The window may be resized by a user prompted resizing feature described in further detail with respect to FIGS. 4-6. In these examples, the individual window may be scaled up to 100% of the native resolution of the remote system 102, or up to the boundary size of the viewable area of the local system 202.

Figure 4:
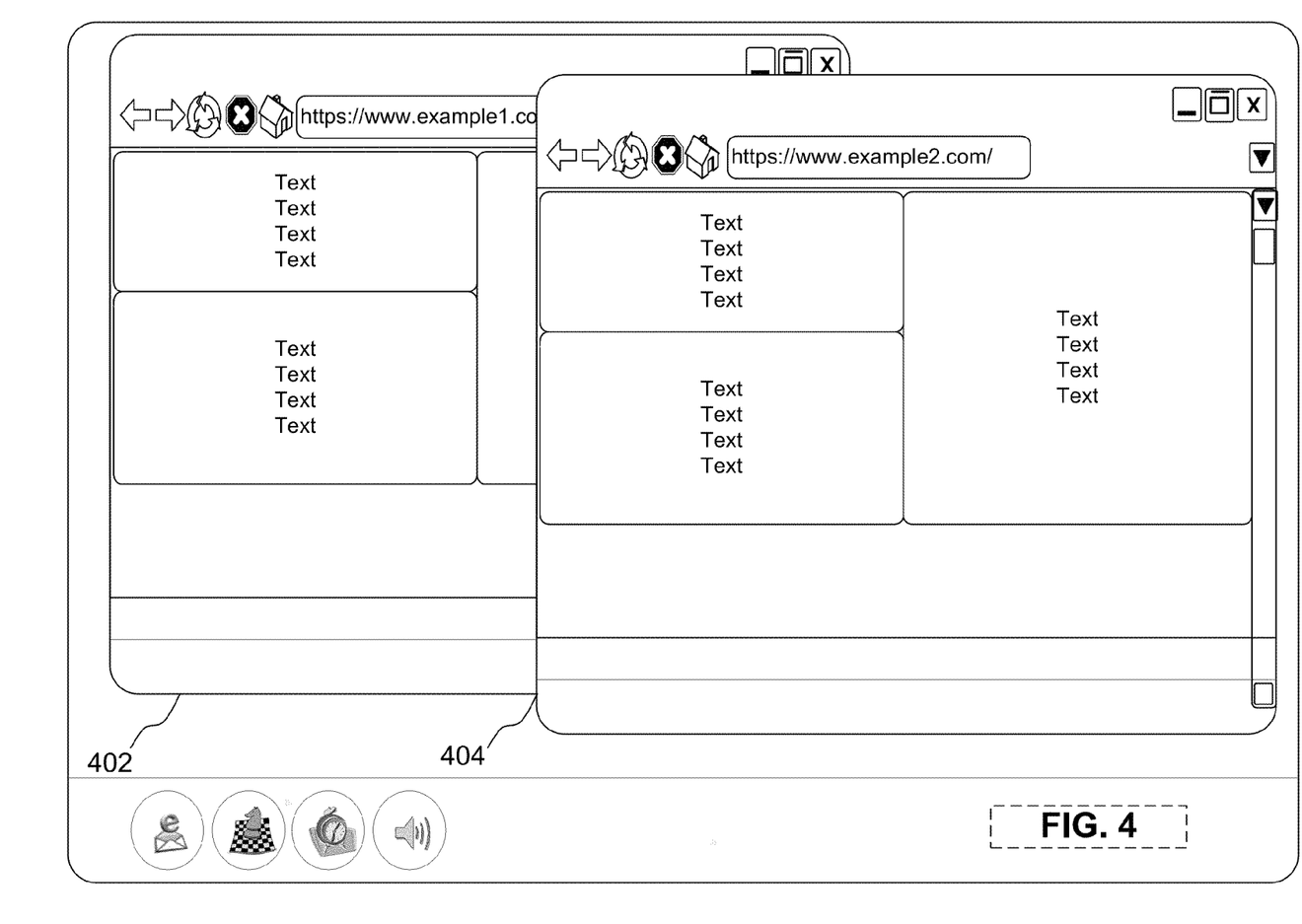
FIG. 4 illustrates an example viewable area of a local system as a fraction of the viewable area of the remote system according to example embodiments of the present invention.

FIG. 4 illustrates an example viewable area of a local computer system represented as a fraction of the viewable area of the remote system according to example embodiments of the present invention. Referring to FIG. 4, the local computer device may display different windows, such as different browser windows 402 and 404. In this example, windows 402 and 404 provide content that is currently being displayed on the managed remote computer system display area 202.

Figure 5:
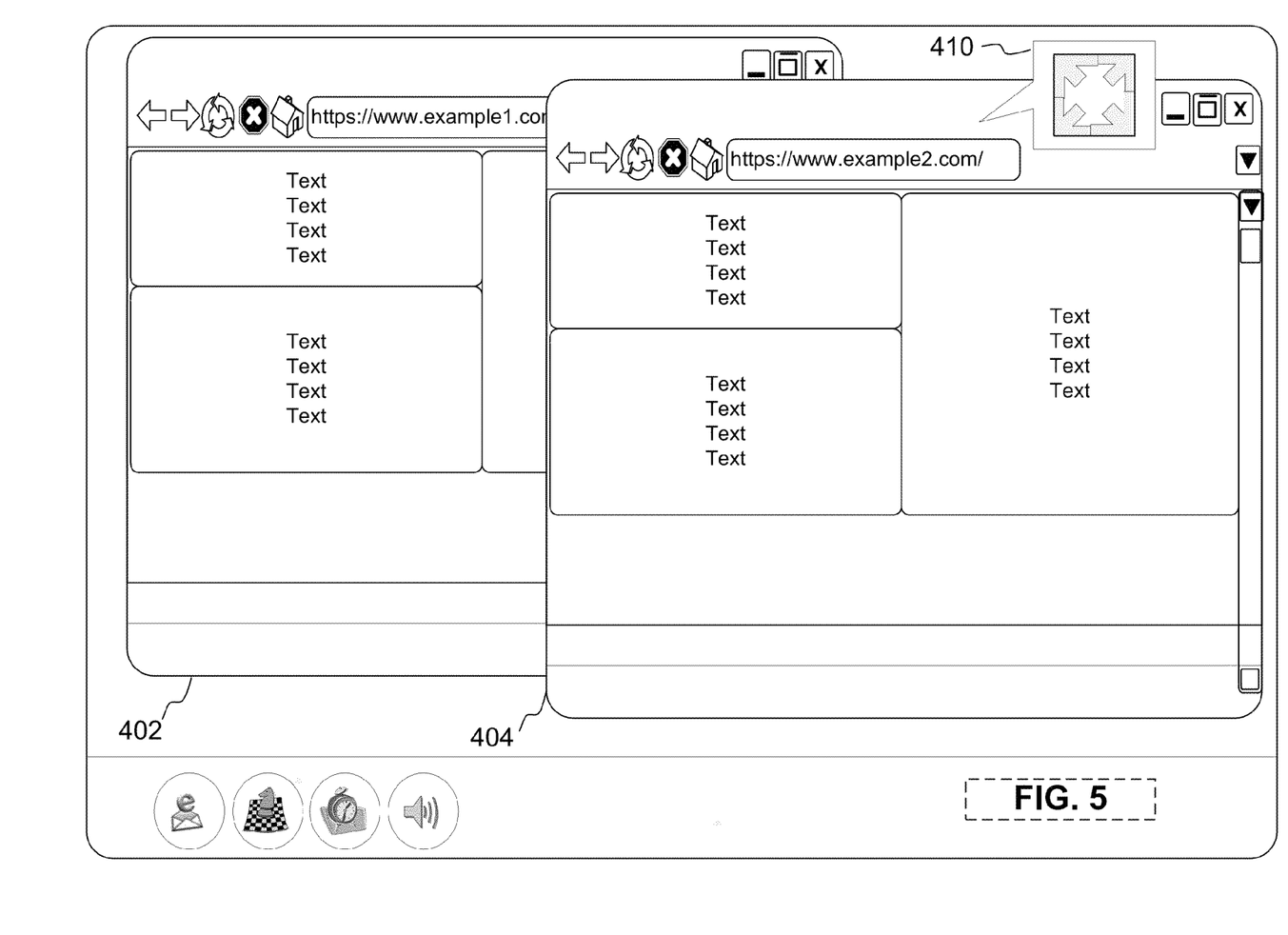
FIG. 5 illustrates an example viewable area of a local system with an option to enlarge one or more portions of the viewable content according to example embodiments of the present invention.

FIG. 5 illustrates an example viewable area of a local system with an option to enlarge one or more portions of the viewable content according to example embodiments of the present invention. Referring to FIG. 5, once the content from the remote computer system is displayed in the display area of the local computer system display area, a sizing option may be presented automatically or in response to the user scrolling over the content area of window 404. The sizing option may be presented as a button 110 that increases the size of the window when selected by the user (i.e., administrator).

Figure 6:
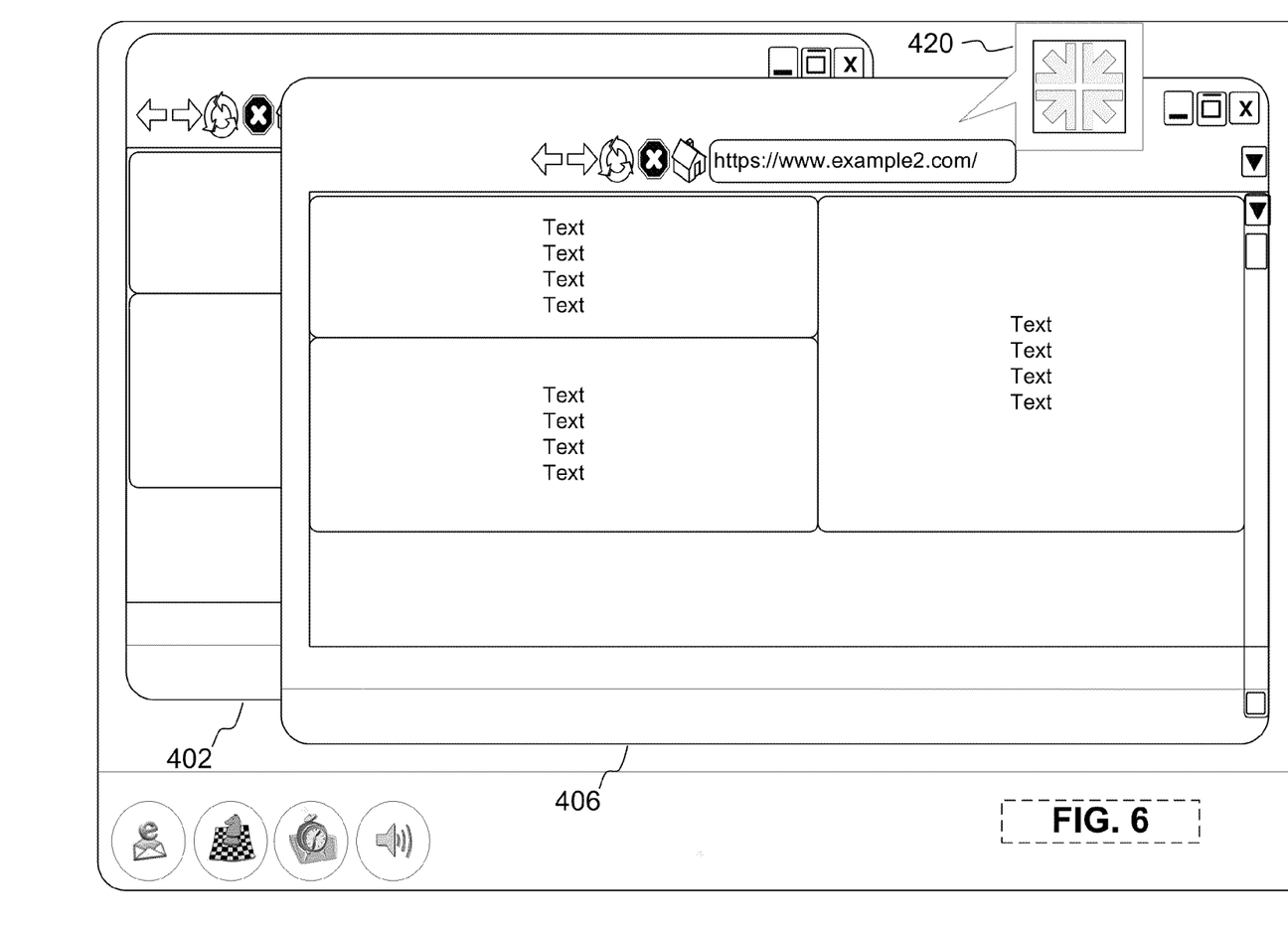
FIG. 6 illustrates an example viewable area of a local system with an option to reduce the size of one or more portions of the viewable content according to example embodiments of the present invention.

FIG. 6 illustrates an example viewable area of a local system with an option to reduce the size of one or more portions of the viewable content according to example embodiments of the present invention. Once the user selects the size increase option 110 of FIG. 5, the window may increase in size as illustrated as an enlarged window 406 as compared to the previous version (see window 404 of FIG. 5). A different option to decrease the size of the enlarged window 420 is presented after the window is enlarged.

According to one example embodiment, a method of controlling the size of the content displayed on a local computing system may include establishing a remote control session and on the local system. The method may also provide displaying a sizing option ("smart zoom" icon) icon. The method may further provide displaying the sizing option when the user hovers a cursor over a particular window that is not being displayed at 100% of the native resolution. The user may select the sizing option by clicking on the icon. The window size may increase responsive to the user's selection. Clicking the icon ("smart zoom") option will enlarge only that window. When a window is enlarged it will retain its aspect ratio, which may not exceed the bounds of the local viewing area. The window displayed on the local computing system will not be enlarged to more than 100% of the native resolution of the remote system.

A window that has been selectively enlarged will have the option to return the window to its original (pre-enlarged) size and position. Enlarging a window will be done independently of the other elements (i.e., other windows, desktop wallpaper, icons, menu bars, task bars, etc.) on the remote computer system. All windows (enlarged or not) and other elements displayed in the viewing area of the display may remain interactive during the connection session of the local and remote computing systems.

The operations of a method or algorithm described in connection with the embodiments disclosed herein may be embodied directly in hardware, in a computer program executed by a processor, or in a combination of the two. A computer program may be embodied on a computer readable medium, such as a storage medium or other non-transitory medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 102 and 103.

Figure 7:
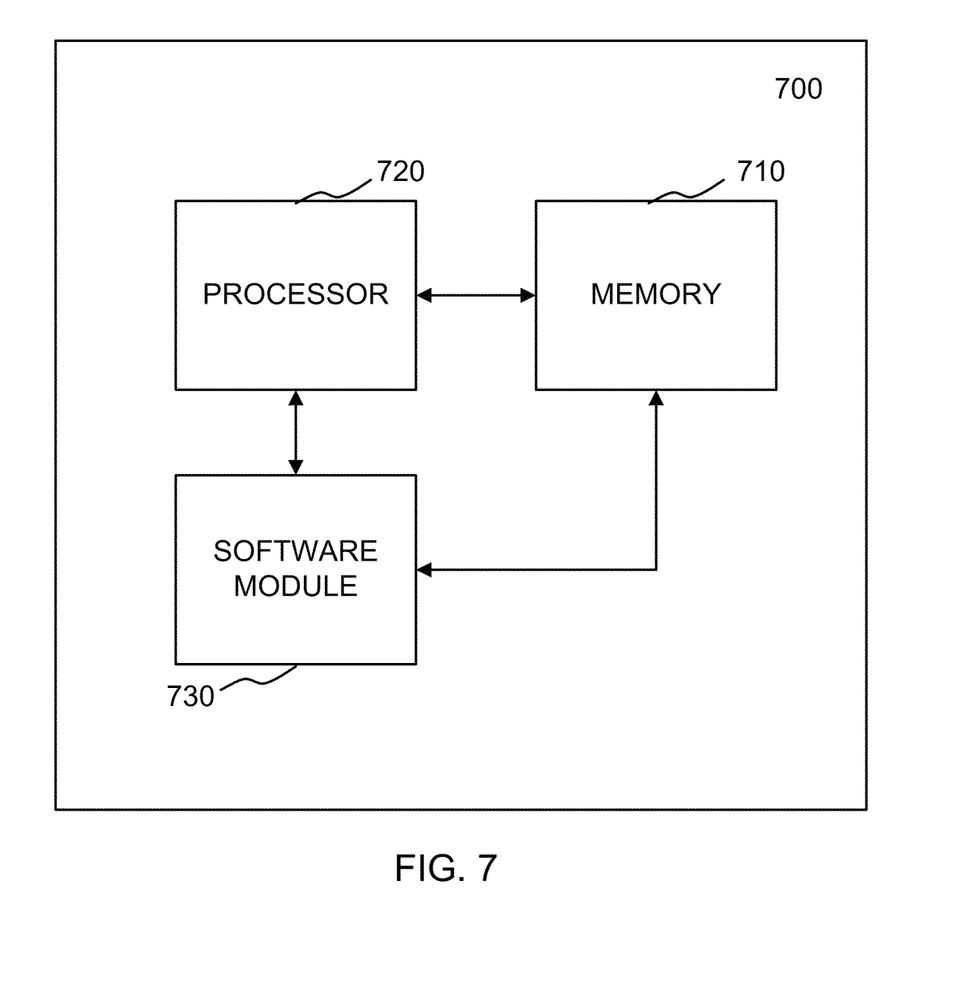
FIG. 7 illustrates a network entity that may include memory, software code and other computer processing hardware, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Figure 8:
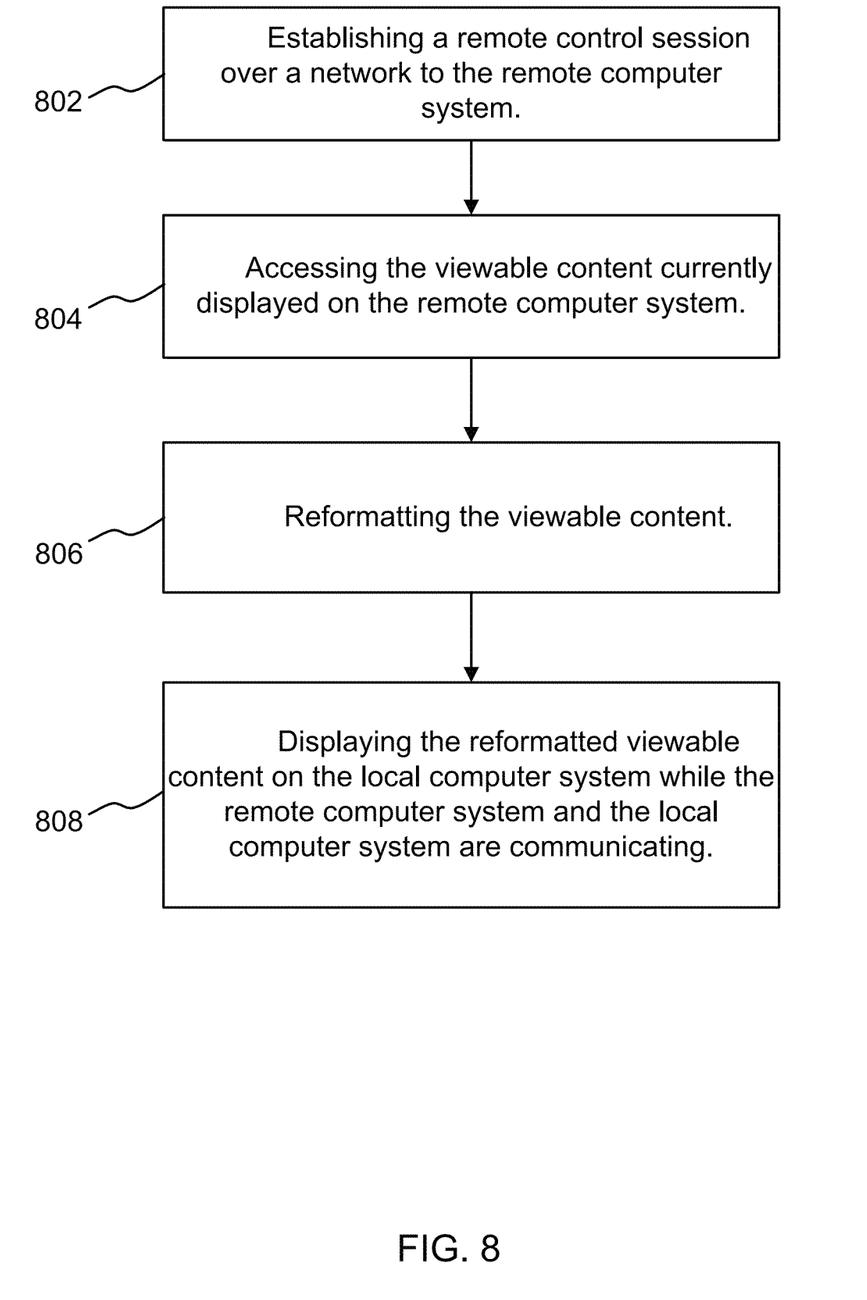
FIG. 8 illustrates a flow diagram of an example method according to example embodiments of the present invention.

One example embodiment of the present invention may include a method controlling the viewable content of a remote computer system on a local computer system. The method may include establishing a remote control session over a network to the remote computer system, at operation 802, accessing the viewable content currently displayed on the remote computer system, at operation 804. The method may also include reformatting the viewable content, at operation 806 and displaying the reformatted viewable content on the local computer system while the remote computer system and the local computer system are communicating at operation 808.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of controlling the viewable content of a remote computer system on a local computer system, the method comprising:

establishing a remote control session over a network to the remote computer system;

accessing the viewable content currently displayed on the remote computer system;

reformatting the viewable content to change a size of the viewable content by identifying a viewable content display area of the remote computer system and comparing the remote resolution associated with the viewable content display area of the remote computer system to a local resolution associated with a viewable content display area of the local computer system;

determining a remote resolution being used on the remote computer system and multiplying the remote resolution by a scaling factor;

applying the scaling factor to the viewable content on the remote computer system to determine the reformatted viewable content;

receiving a user input indication of a hovering action being performed over a window currently displayed as part of the viewable content;

displaying a size indication icon responsive to the hovering action; and displaying the reformatted viewable content on the local computer system while the remote computer system and the local computer system are communicatively connected.

2. The method of claim 1, wherein the remote control session is established over a secure channel.

3. The method of claim 1, wherein accessing the viewable content currently displayed on the remote computer system comprises accessing at least two windows that are currently displayed on the remote computer system.

4. The method of claim 1, further comprising:
prompting the user with a sizing option to perform at least one of increase and decrease the size of the viewable content displayed on the local computing system;
receiving input from the user to change a size of the viewable content; and
changing the size of the viewable content responsive to the user's input.

5. The method of claim 1, further comprising:
receiving user input that the size indication icon has been selected;
modifying a current size of the window; and
displaying a different size indication icon to the user that performs an opposite sizing action to the modifying operation previously performed.

6. An apparatus configured to control the viewable content of a remote computer system on a local computer system, the apparatus comprising:
a transmitter configured to establish a remote control session over a network to the remote computer system, and access the viewable content currently displayed on the remote computer system;
a processor configured to
determine a remote resolution being used on the remote computer system and multiplying the remote resolution by a scaling factor,
apply the scaling factor to the viewable content on the remote computer system to determine the reformatted viewable content,
reformat the viewable content to change a size of the viewable content,
identify a viewable content display area of the remote computer system, and compare the remote resolution associated with the viewable content display area of the remote computer system to a local resolution associated with a viewable content display area of the local computer system;
a receiver configured to receive a user input indication of a hovering action being performed over a window currently displayed as part of the viewable content, and wherein the display is configured to display a size indication icon responsive to the hovering action; and
a display configured to display the reformatted viewable content on the local computer system while the remote computer system and the local computer system are communicatively connected.

7. The apparatus of claim 6, wherein the remote control session is established over a secure channel.

8. The apparatus of claim 6, wherein the viewable content currently displayed on the remote computer system comprises at least two windows that are currently displayed on the remote computer system.

9. The apparatus of claim 6, wherein the processor is further configured to prompt the user with a sizing option to perform at least one of increase and decrease the size of the viewable content displayed on the local computing system; receive input from the user to change a size of the viewable content, change the size of the viewable content responsive to the user's input.

10. The apparatus of claim 6, wherein the receiver is further configured to receive user input that the size indication icon has been selected, and the processor is further configured to modify a current size of the window, and the display is configured to display a different size indication icon to the user that performs an opposite sizing action to the modifying operation previously performed.

11. A non-transitory computer readable storage medium configured to store instructions that when executed cause a processor to perform controlling the viewable content of a remote computer system on a local computer system, the processor being further configured to perform:
establishing a remote control session over a network to the remote computer system;
accessing the viewable content currently displayed on the remote computer system;
determining a remote resolution being used on the remote computer system and multiplying the remote resolution by a scaling factor;
applying the scaling factor to the viewable content on the remote computer system to determine the reformatted viewable content;
reformatting the viewable content to change a size of the viewable content by identifying a viewable content display area of the remote computer system and comparing the remote resolution associated with the viewable content display area of the remote computer system to a local resolution associated with a viewable content display area of the local computer system;
receiving a user input indication of a hovering action being performed over a window currently displayed as part of the viewable content;
displaying a size indication icon responsive to the hovering action; and
displaying the reformatted viewable content on the local computer system while the remote computer system and the local computer system are communicatively connected.

12. The non-transitory computer readable storage medium of claim 11, wherein the remote control session is established over a secure channel.

13. The non-transitory computer readable storage medium of claim 11, wherein accessing the viewable content currently displayed on the remote computer system comprises accessing at least two windows that are currently displayed on the remote computer system.

14. The non-transitory computer readable storage medium of claim 11, wherein the processor is further configured to perform:
prompting the user with a sizing option to perform at least one of increase and decrease the size of the viewable content displayed on the local computing system;
receiving input from the user to change a size of the viewable content; and changing the size of the viewable content responsive to the user's input.

\* \* \* \* \*